UNITED STATES PATENT OFFICE.

R. EDWARD BALL, OF JAMAICA, NEW YORK.

IMPROVEMENT IN ARTIFICIAL-LEATHER COMPOSITIONS.

Specification forming part of Letters Patent No. 210,079, dated November 19, 1878; application filed February 15, 1878.

*To all whom it may concern:*

Be it known that I, R. EDWARD BALL, of Jamaica, in the county of Queens and State of New York, have invented a certain new and useful Imitation Coating for Fabrics; and I do hereby declare the following to be a full, clear, and exact description of the invention, such as will enable others skilled in the art to which it pertains to make and use it.

My invention consists of a compound intended to be spread upon or otherwise suitably applied to paper, linen, cotton, or other fibrous or textile material, for the purpose of forming a surface thereon, which may be stamped, molded, or otherwise impressed, in imitation of leather and other substances.

Said compound is made as follows: Dissolve ground glue in water by the application of heat, adding ferric chloride and glycerine, in the proportions hereinafter stated. Then mix in thoroughly ground mineral paint, in quantity sufficient to give the required color, and add a mixture of crude quercitannic acid and alum.

The proportions that I prefer, (which may be varied somewhat, according to the skill and judgment of the compounder) are as follows:

Ground glue, nine pounds; water, six pounds; ferric chloride, three quarters of a pound; glycerine, five pounds; alum, (pulverized,) one and one-half pound; quercitannic acid, three and one-quarter pounds; mineral paint, sufficient quantity.

This mixture is spread as a layer upon the material adapted to receive it. The surface thus formed may, before hardening, be embellished in any suitable way to produce the desired imitation.

What I claim, and desire to secure by Letters Patent, is—

The compound or mixture for producing a durable surface on paper, linen, cotton, or other fibrous or textile material, consisting of dissolved glue, ferric chloride, glycerine, alum, and quercitannic acid, in or about the proportions specified.

In testimony that I claim the foregoing I have hereunto set my hand this 11th day of February, 1878.

R. EDWARD BALL.

Witnesses:
 THEO. R. CHAPMAN,
 EUGENE OAKLEY.